Sept. 24, 1968            R. C. GEITZ            3,402,480

DRYING APPARATUS AND METHOD FOR SHEET TOBACCO OR THE LIKE

Filed Oct. 20, 1965            4 Sheets-Sheet 1

INVENTOR
ROBERT C. GEITZ
BY *Elda N. Luther*
ATTORNEY

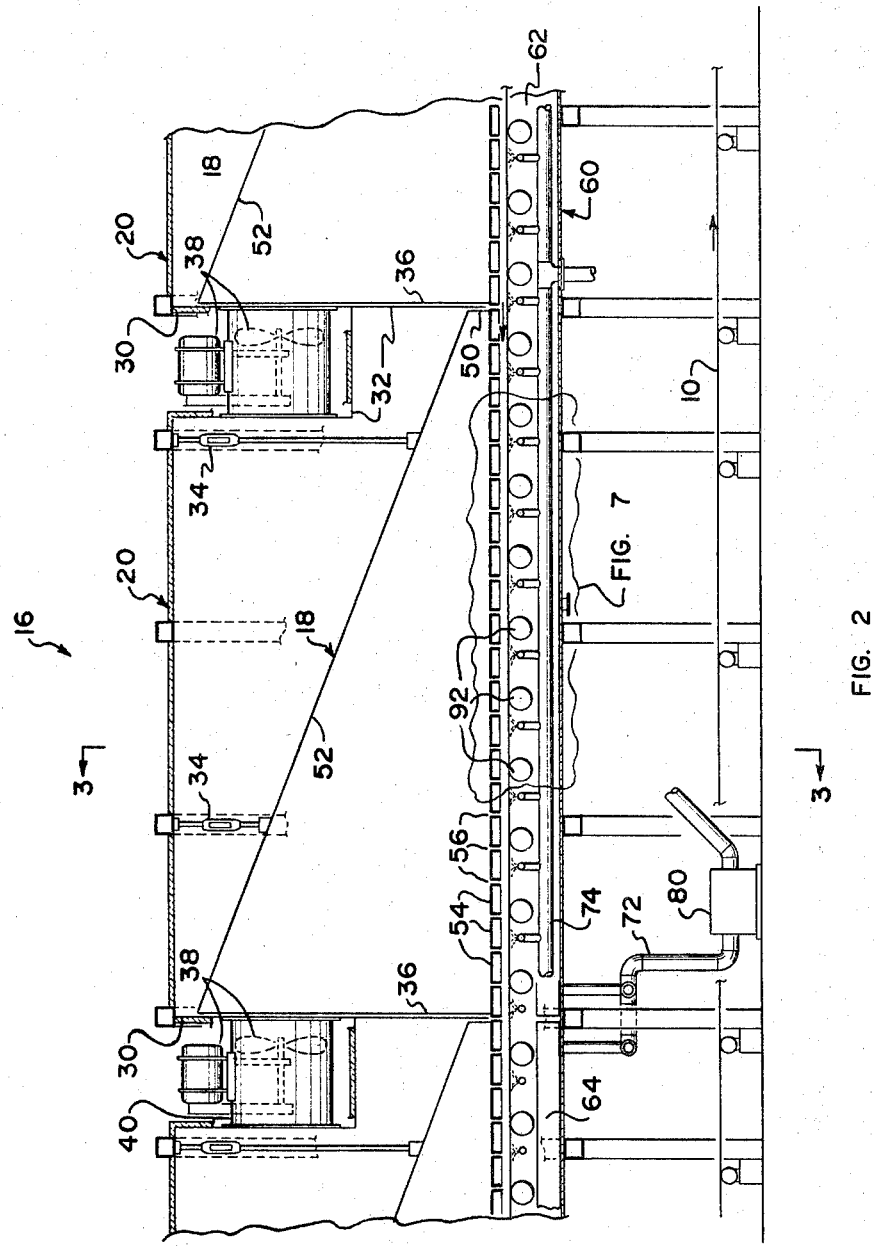

Sept. 24, 1968 R. C. GEITZ 3,402,480
DRYING APPARATUS AND METHOD FOR SHEET TOBACCO OR THE LIKE
Filed Oct. 20, 1965 4 Sheets-Sheet 3
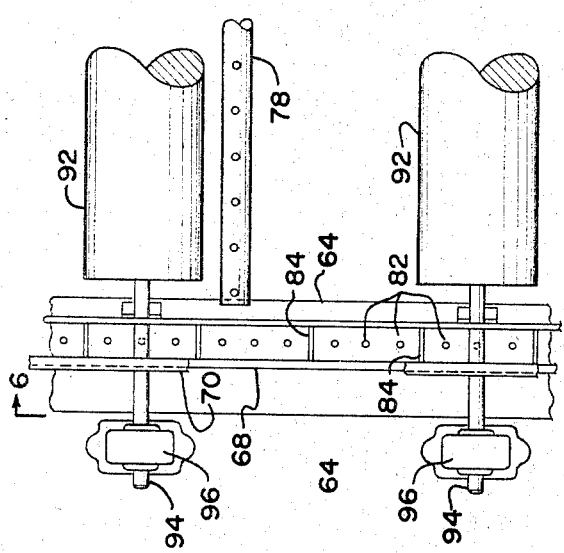
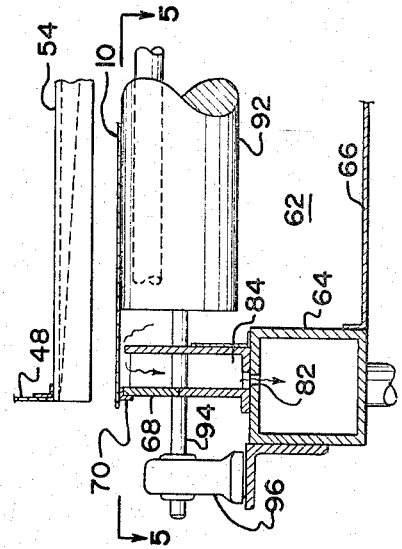
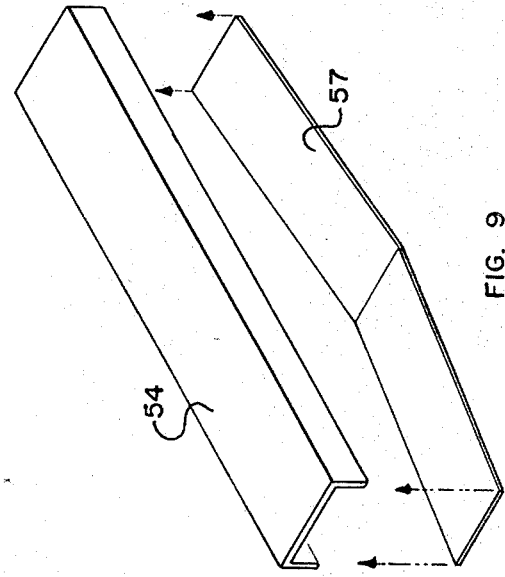
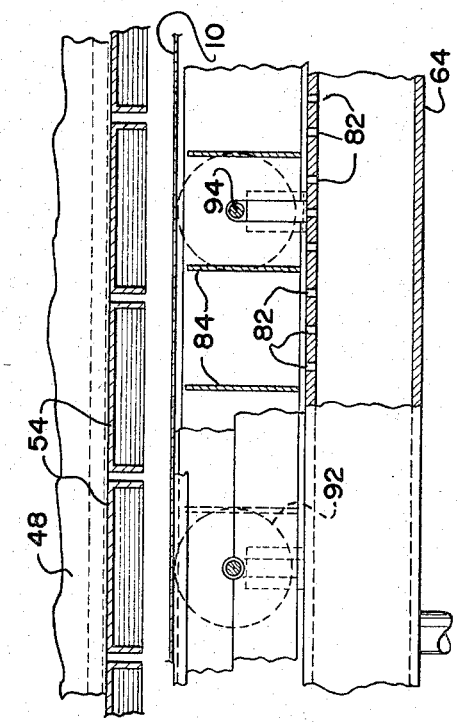
INVENTOR
ROBERT C. GEITZ
BY Eldon H. Luther
ATTORNEY

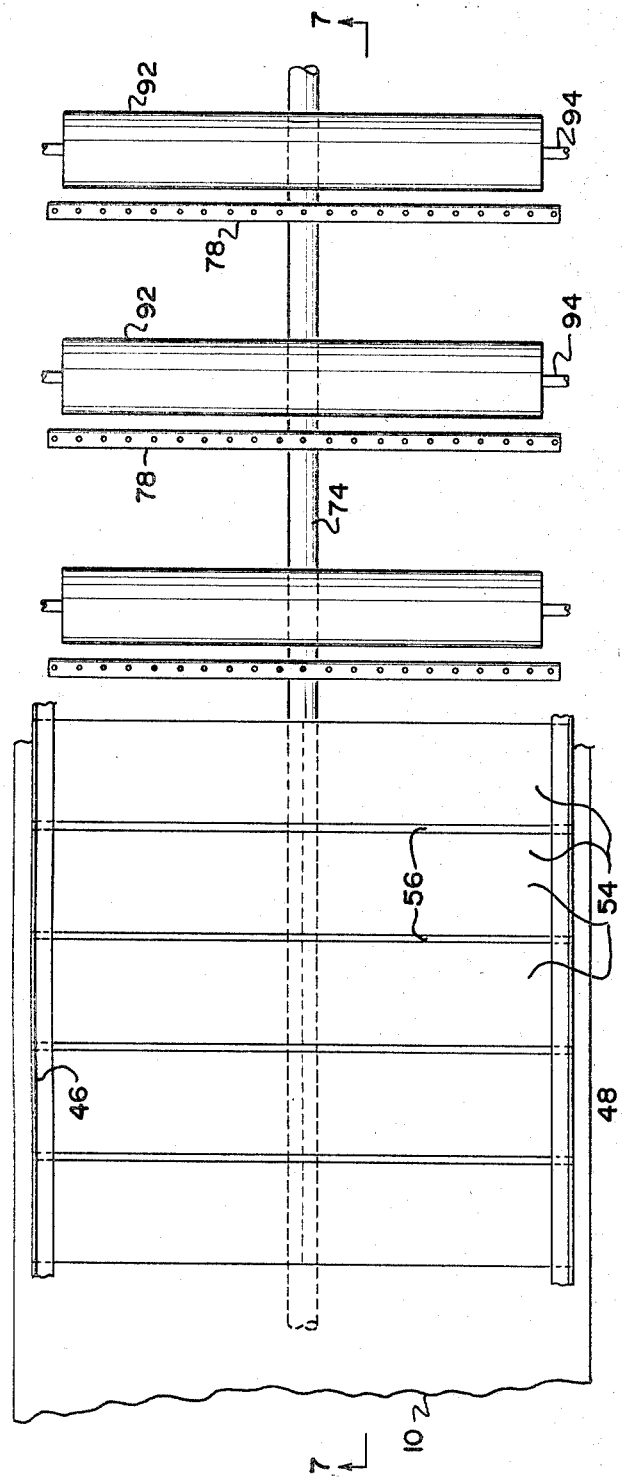
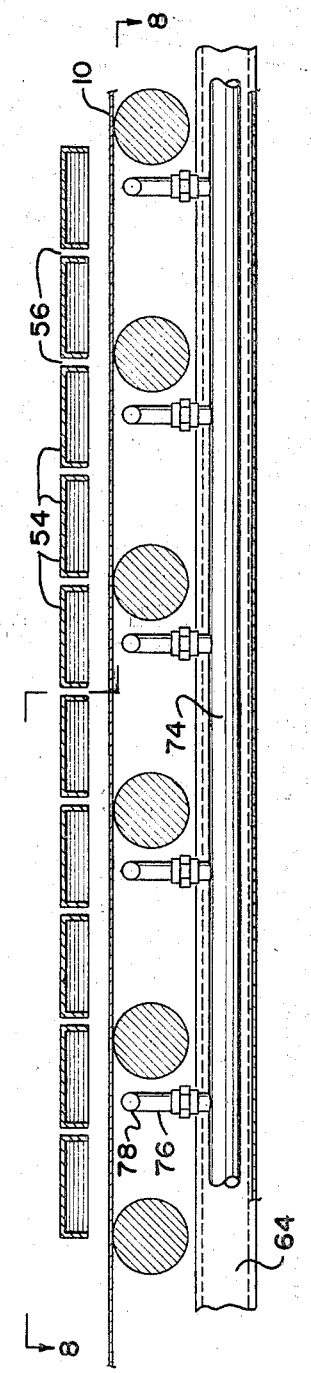

United States Patent Office 3,402,480
Patented Sept. 24, 1968

3,402,480
DRYING APPARATUS AND METHOD FOR SHEET TOBACCO OR THE LIKE
Robert C. Geitz, 7 Hoplea Road, Simsbury, Conn. 06070
Filed Oct. 20, 1965, Ser. No. 498,223
15 Claims. (Cl. 34—151)

ABSTRACT OF THE DISCLOSURE

A drying method and system for said material disposed upon a conveyor belt for drying purposes wherein the lower portion of the belt at a drying region is heated by steam while heated air is passed over the upper region of the belt.

A subatmospheric pressure is maintained below the belt at the heating region while atmospheric pressure is provided on the belt upper surface. The distribution system for conveying air over the belt provides a relatively uniform drying action.

---

This invention relates generally to an improved apparatus and method for the drying of sheet material, such as sheet tobacco, and has particular relation to such an apparatus and method wherein the material to be dried is conveyed through a drying zone on a continuously moving conveyor belt with the drying being effected by simultaneously heating the underside of the belt in the drying zone and passing a gas, which may be air, over the upper surface of the belt and accordingly the surface of the sheet material that is to be dried.

In prior art apparatus of the type to which the invention pertains, difficulty has been experienced due to the conveyor belt bowing upward and fluttering as it passes through the drying zone. Difficulty has also been experienced because of there being a relatively poor distribution of the drying gas passing over the belt which tends to effect a non-uniform drying of the moist sheet material. These difficulties are overcome with the present invention wherein there is utilized an improved distribution system for causing the drying gas to pass over the upper surface of the belt and wherein a sufficient pressure differential is maintained between the upper and lower surface of the belt in the drying zone to insure that there will be no belt flutter and no upwardly bowing of the belt.

The distribution system for the drying gas includes a plurality of distributors that are positioned in immediate successive relation lengthwise of the conveyor belt. A fan is provided at the entrance of each of the distributors and the distributors are provided with a distribution surface or floor spaced slightly above the belt and having a number of outlet passageways which extend transversely of the belt. The design of the distributors is such as to provide a relatively uniform flow resistance to the gas passing through them. The distributors are connected in cascade or series flow relations such that the gases pass from one distributor to the next succeeding distributor in a direction opposite to the direction of movement of the conveyor belt.

Heat is imparted for the drying operation by means of a steam heating system positioned beneath the belt and immediately below the area over which the drying gas is conveyed. This steam heating system includes a housing which has upwardly extending side and end walls that are in sliding engagement with the lower surface of the conveyor belt thereby forming, with the belt, an enclosed chamber. Support rolls extend laterally across this chamber with the belt resting upon and being supported by these rolls. Steam, which may be at atmospheric pressure and saturation temperature, is admitted to this chamber through a suitable piping system. In order to maintain the pressure in this chamber such that the pressure exerted against the underside of the belt will be somewhat lower than that exerted against the upper side of the belt in this drying zone there is provided a vacuum pump system for withdrawing steam from the chamber.

It is accordingly an object of this invention to provide an improved drying system and method for drying moist sheet-like material, such as sheet tobacco.

Another object of this invention is to provide such an apparatus and method which effects a uniform drying of the material and is efficient and satisfactory in operation.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings, wherein:

FIGURE 2 is in the nature of a fragmentary side view of a portion of the drying system of the invention with there being shown in this view one of the distributors for conveying gas over the upper surface of the conveyor belt;

FIGURE 4 is a detailed fragmentary view of the portion of the invention contained generally within the circle identified as 4 in FIGURE 3;

FIGURE 5 is also a fragmentary view being taken generally from line 5—5 of FIGURE 4;

FIGURE 6 is a detailed view partly in section, taken generally along line 6—6 of FIGURE 5;

FIGURE 7 is a fragmentary sectional view of a portion of the drying system of the invention showing in detail the system for projecting the steam against the bottom surface of the conveyor belt and also showing the channel construction of the floor or distribution surface of the gas distributor;

FIGURE 8 is also a fragmentary view being taken generally along line 8—8 of FIGURE 7; and FIGURE 9 is an exploded view of one of the channels that form the bottom of the distributors.

Figure 1:
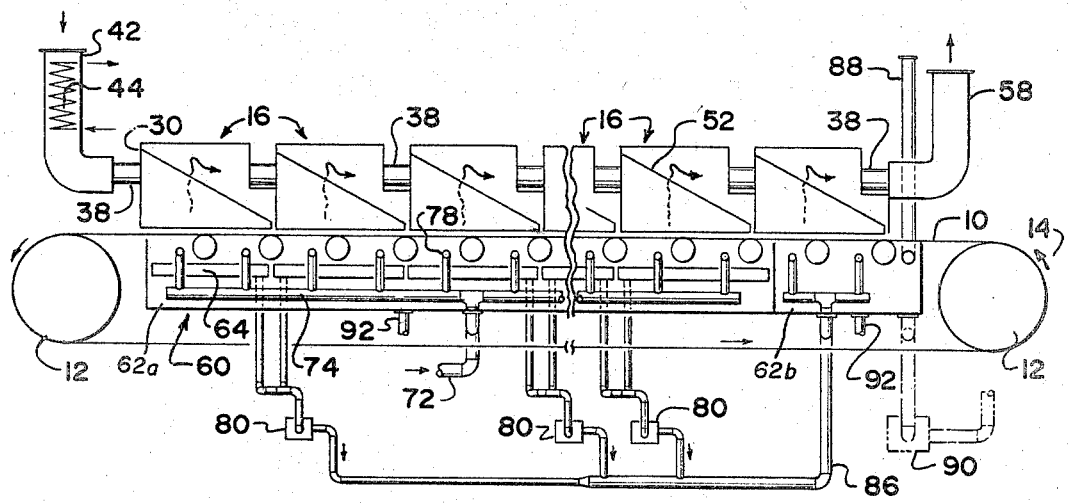
FIGURE 1 is in the general nature of a schematic view of the drying system of the invention with certain parts being enlarged and moved somewhat from their actual location in order that they may be shown in this view and to provide a better understanding of the invention.

Referring now to the drawings, wherein like reference characters are used throughout to designate like elements, the illustrative and preferred embodiment of the invention as depicted therein includes the endless conveyor belt 10 which passes over the end rolls 12 and is driven in the direction indicated by arrow 14. This conveyor belt may be a relatively long belt which passes through several process areas or zones in a manufacturing process, such as the manufacture of sheet tobacco, with one of these zones being the drying area or zone with which the present invention is concerned. As the belt passes through this drying zone there is contained on its upper surface a thin layer of moist material in the nature of a sheet which is to be dried to a predetermined uniform dryness. To effect this result gas is conveyed over the upper surface of the belt and accordingly over this sheet material while heat is applied to the under surface of the belt at the drying zone. Air is the preferred gaseous medium conveyed over the upper surface of the conveyor belt and the sheet of material to be dried that is disposed on this belt, and while reference will be made hereinafter to air as the drying medium, it is to be understood that other suitable gases may be used if the process with which the drying apparatus is employed is such that it is advantageous to use a particular gas other than air.

The system for directing air over the upper surface of the belt includes a plurality of distributors identified generally as 16, and which are positioned and connected in immediate successive relation lengthwise of belt as shown in FIGURE 1. Each of the distributors 16 is of similar construction and is provided with an inner housing or distribution chamber 18 (FIGS. 2 and 3) and an outer housing or collecting chamber 20. This collecting chamber is substantially a complete enclosure and is fixedly mounted, with the chamber being comprised of sidewalls 22 and 24, roof 26 and laterally extending plate members 28 at the bottom thereof extending inwardly from the sidewalls and secured at their inner extremities to the sidewalls of the steam compartment 62 disposed beneath the conveyor belt. The front of the collecting chamber is effectively closed by the front plate member 30 while the rear of this chamber is effectively closed by the rear plate member 32. In the region over belt 10 these rear and front plate members 30 and 32 terminate at a distance slightly above the upper surface of the belt. If desired, the rear plate 32 on all but the endmost distributor from which the air is discharged to atmosphere may be formed by the front plate of the immediate successive distributor.

The distribution chamber or inner housing 18 is hung within the collecting chamber 20 by means of the vertically adjustable hanger rods 34 with the forward end 36 of this chamber 18 being in sliding engagement with the front plate member 30. Air is forced into the distribution chamber 18 by means of the motor operated fan assembly 38 mounted in the duct 40. Each of the distributors 16 is provided with such a fan mechanism and the first or upstream distributor receives heated air through the duct 42 within which is disposed the heating coil 44. The fan assembly 38 at the inlet of the first distributor 16 draws air through the duct 42 and forces it into the distribution chamber 18.

Figure 3:
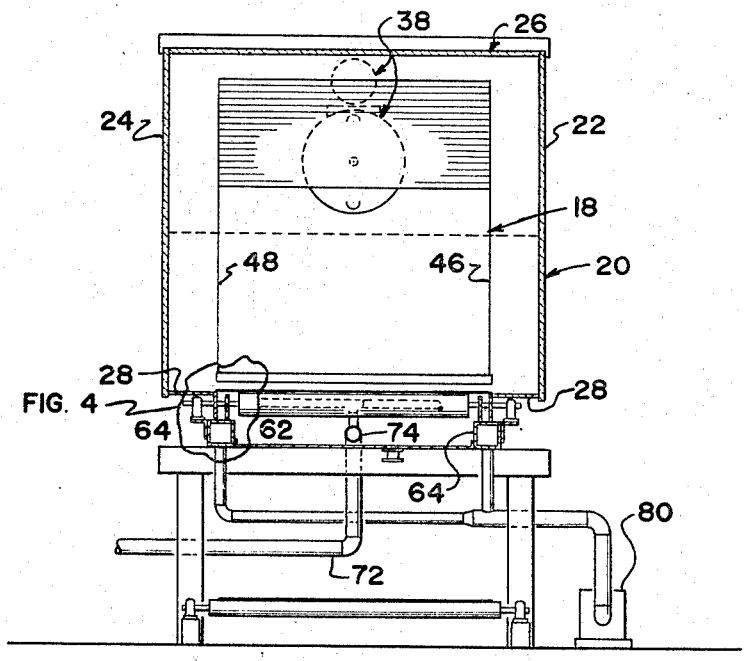
FIGURE 3 is a sectional view taken generally along line 3—3 of FIGURE 2.

The chamber 18 is formed by means of sidewalls 46 and 48, rear wall 50 and roof 52. The roof 52 slants downwardly in the direction of air flow such that the transverse area of the chamber 18 progressively decreases in the direction of air flow. This provides for a more uniform flow resistance and more uniform distribution of air flow through the many passageways formed in the bottom of the chamber 18 than would be the case if this transverse area remained unchanged. The bottom of the inner housing or distribution chamber 18 is formed by a plurality of inverted channels 54 secured in spaced relation so as to form many passageways 56 which extend transversely across the full width of the chamber and across the belt 10. These passageways 56 are generally uniformly distributed throughout the length of the chamber 18 and the downwardly extending flanges of the channels 54 terminate in spaced relation above the surface of belt 10 as best shown in FIGURE 7. The heated air passes out of the chamber 18 through the laterally extending passageways 56 across the surface of belt 10 and then upwardly between chamber 18 and collecting chamber 20 (FIGURE 3). This air is conveyed out the back end of the collecting chamber through the next fan assembly 38 and introduced into the next succeeding distribution chamber. In order to insure a generally uniform velocity of the air across the belt and genrally uniform drying action transversely of the belt, plate member 57 (FIGURE 9) is disposed intermediate the flanges of each of the channels 56. This plate member slopes upwardly from its central region toward its outer ends thereby providing a progressively increasing volume between this member and the belt to accommodate the increasing quantity of air at the outer region of the belt.

The slanting roof 52 of the distribution chamber 18 provides for an increasing transverse area for the collecting chamber in the direction of gas flow. Since the quantity of air passing through the distribution chamber 18 decreases in the direction of gas flow and the quantity of air passing through the collecting chamber 20 increased in the direction of gas flow, this particular arrangement provides for a relatively uniform flow resistance in the passage of the air through the distributor 16.

The many passageways 56 formed in the floor of the distribution chamber 18 and which extend across the width of the belt 10 provide for good contact of the air with the moist sheet material disposed on the upper surface of the belt and give a uniform drying action as a result of this air sweeping across this material. The heated air progressively passes in a series or cascade fashion from one distributor to the next in a direction opposite to the direction of movement of the belt 10 with the air becoming progressively cooler such that it is at its coldest in the final distributor with the air then being exhausted and forced by the final fan assembly 38 through a discharge or stack 58.

Heat is applied to the underside of belt 10 in the region directly below the distributors 16 by means of the steam heating system that includes the housing 60 mounted beneath the belt and which cooperates with the belt to form a chamber 62. The housing is formed of longitudinally extending box headers 64 between which extends plate member 66. Projecting upwardly from the headers 64 are the sidewall members 68 with these members being provided at their upper edges with a brass engaging strip or land 70 (FIGURE 4) which is in engagement with the lower surface of the belt 10 adjacent to the extreme edges of the belt. This engagement is such as to form a good seal against the passage of air into the chamber 62. The chamber 62 is completed by end walls which extend upwardly and engage the belt at their upper ends.

Steam is supplied to the chamber 62 from a suitable steam source through conduit 72 which connects with conduit 74 extending lengthwise of chamber 62. At various locations along the length of conduit 74 there extends upwardly therefrom the branch conduits 76 which in turn are connected with laterally extending distributors 78 provided with openings for directing steam onto the underside of the belt as shown in FIGURE 7. A partition wall is provided to divide the chamber 62 into two sections identified in FIGURE 1 as 62a and 62b with section 62a receiving steam in the manner just explained while section 62b receives steam which is exhausted from section 62a.

Steam is drawn from the chamber section 62a by means of the vacuum pumps 80 which have their inlets connected with the headers 64 with these headers being sectionalized as shown in FIGURE 1. Steam enters the headers 64 through the many openings 82 formed in the upper wall of the headers. Steam is drawn into these headers from the upper region of the chamber 62 and for this purpose there is provided baffle extending upwardly from the headers 64 and terminating in spaced relation with the underside of belt 10 as best shown in FIGURE 4. Support plates 84 extend between the sidewall members 68 and the baffle plates.

The steam that is withdrawn from the chamber section 62a is conveyed from the vacuum pumps 80 through the conduit 86 into the chamber section 62b where it is directed against the underside of the belt 10. The chamber section 62b is located below the distributor 16 which handles the coldest air. Furthermore, this section 62b is the furthest forward in regard to movement of the belt 10 so that the coldest condition of the belt is here encountered. Thus, most of the steam directed against the belt and in this chamber section 62b will be condensed. As a result of this action, the pressure within the chamber section 62b will be somewhat less than atmosphere in normal operation. A vent 88 is provided for this chamber section 62b and air will be drawn into the chamber section through this vent. If difficulty is encountered in maintaining a subatmospheric pressure within the chamber section 62b a vacuum pump 90 may be provided to maintain a reduced pressure within this chamber section. Condensate is withdrawn from both sections of the chamber 62 through the dischargers 92 which communicate with a water seal or the like (not shown).

It will be understood that the pumps 80 and 90 can be any suction creating device such as an eductor, a blower, a reciprocating pump, a turbine type pump, etc.

The vacuum pumps 80 are effective to maintain a reduced subatmospheric pressure within the chamber section 62a. This partial vacuum may be in the order of a ¼ of a pound/square inch. The pressure of the air passing over the upper surface of the belt is such that the air pressure exerted against this surface is atmospheric or perhaps slightly above atmospheric with the result being that there is a pressure differential between the pressure exerted against the upper surface and the pressure exerted against the lower surface of the belt which urges the belt downward against the lands 70 at each side of the belt, thus providing for good sealing engagement with these lands and preventing the belt from bowing upwardly or fluttering.

In order to adequately support the belt in the drying zone with the presence of this differential pressure there is provided support rollers 92 extending laterally beneath and engaging the under surface of the belt. These rollers are mounted on suitable shafts 94 journaled in bearings 96 supported from flanges secured to the headers 64. In an installation utilizing a stainless steel belt approximately 4′ wide and .004″ thick, the rollers may be spaced on approximately 18″ centers with there then being only ¹⁄₁₆″ downward bow of the belt intermediately the rollers when a differential pressure across the belt exists of a magnitude of approximately ¼ of a pound/square inch.

With the arrangement of the present invention excellent utilization of the heating value of the steam that is supplied to the dryer is provided as well as excellent utilization of the drying air that is directed over the surface of the belt. Uniform drying is obtained with this improved organization and the belt remains in place during traversal of the drying zone with excellent sealing between the walls of the steam heating chamber and the belt being achieved such that little air is admitted to the steam heating chamber and good heat transfer is thus obtained.

While I have illustrated and described a preferred embodiment of my invention, it is to be understood that such is merely illustrative and not restrictive and that various modifications and changes may be made therein without departing from the spirit and scope of the invention. I therefore do not wish to be limited to the precise detail set forth but desire to avail myself of such changes as fall within the purview of my invention.

What I claim is:

1. A drying apparatus for a sheet-like material comprising in combination a moving flat, thin web resting on a support and adapted to carry on its upper surface said material, means for conveying a gas over said upper surface, means for maintaining the atmosphere on the underside of said web at a pressure slightly below the pressure to which the upper surface of said web is subjected with this last named means including steam heating means.

2. The drying apparatus of claim 1 including means for forming a steam heating chamber beneath said web with the web forming the upper wall of the chamber, means for introducing steam into said chamber to heat said web, and pump means operative to withdraw steam from said chamber and reduce the pressure within the chamber.

3. The drying apparatus of claim 2 wherein means are provided to direct a gas stream successively over the upper surface of said web at locations successively further forward with regard to the direction of movement of the web and wherein said compartment is effectively disposed below these locations and is divided into sections with the forwardmost section having steam applied thereto which has been exhausted from other sections.

4. In a processing system having a conveyor belt with a horizontal run the combination of a drying device associated with a portion of said horizontal run and including a heating chamber beneath said portion having belt support means therein and having upwardly extending side walls, the upper extremities of said side walls engaging the lower surface of said horizontal belt portion adjacent the edges thereof, whereby said belt portion forms the top of said chamber, means for forcing a gas over the upper surface of said horizontal portions, means for heating the lower surface of said horizontal belt portion and maintaining the pressure thereagainst lower than the pressure against the upper surface with this last named comprising means for introducing steam into said chamber and pump means for evacuating steam from said chamber.

5. The organization of claim 4 wherein said support means comprises rollers extending between the sides of said chamber.

6. Drying apparatus for use in drying moist sheet material, such as tobacco, comprising a conveyor belt having a generally horizontal region, means for heating the underside of said horizontal region, means for conveying a gas over the upper region of the belt, this last named means including a plurality of distributors connected in series flow relation and disposed in successive positions longitudinally of the belt, means for passing a heated gas successively through said distributors in a direction generally opposite to the movement of the belt at said region, each of said distributors included a distributing chamber having a surface in parallel closely spaced relation above the upper surface of the belt, each such surface having a plurality of passageways extending transversely of the belt longitudinally of the chamber, a collecting chamber disposed about both sides and above said distributing chamber to receive the egressing gas from said passageways such that this gas may flow from the central region of the belt laterally outward to both sides thereof.

7. Drying apparatus comprising in combination a flat conveyor belt adapted to have disposed thereon a sheet of material that is to be dried, means for directing a gas over the upper surface of said belt for drying purposes and including a plurality of distributors connected in cascade and positioned immediately adjacent each other at locations progressively further forward in opposition to the direction of movement of the conveyor, each of said distributors including a distribution chamber the lower surface of which is in generally closely spaced relation to the upper surface of the conveyor and provided with a plurality of passageways extending transversely of the conveyor and spaced longitudinally of the chamber, the roof of the chamber extending downward toward the conveyor such that the transverse area of the chamber decreases in a direction opposite to conveyor movement, motor operated fan means operative to direct the gas into the chamber at the end thereof of greatest transverse area, means forming a collecting chamber positioned about the distributing chamber and having a progressively increasing transverse area in the direction opposite to movement of the conveyor.

8. The apparatus of claim 7 including support means extending longitudinally of and beneath said conveyor, said support means including elongated members engaging the lower surface of the conveyor adjacent the edges thereof, the means forming the collecting chamber including laterally extending plate members connected with the elongated members, said laterally extending members connected with additional wall members to form said chamber.

9. Drying apparatus comprising in combination a conveyor belt at least a portion of a run of which is horizontal, means for heating a region of said portion and including means forming, with said belt, a chamber beneath said region, this last named means including upstanding side and end walls in sliding engagement with the lower surface of said belt, means for maintaining a sub-atmospheric pressure in said chamber, means for introducing steam into the chamber to heat the belt, and means for directing a gas over the upper surface of said belt at said region.

10. Apparatus for drying sheet tobacco comprising in combination a moving conveyor belt the upper surface of which is adapted to carry said tobacco, means operative to contact the underside of said belt with steam throughout a given location to heat the belt, means of directing heated air over the upper surface of the belt at this location, this last named means including a plurality of distributors connected in cascade relation in a direction opposite to the movement of the belt with each of the distributors including a distributing housing the bottom of which is in closely spaced relation to the belt, said bottom extending generally throughout the width of the belt and extending a substantial distance lengthwise of the belt, said bottom having provided therein a plurality of passageways extending transversely of the belt with said passageways being spaced longitudinally of the belt and a collecting housing disposed about said distribution housing and communicating with the space therebeneath on both sides thereof so that the gas flows laterally across the belt in both directions from a generally central location.

11. In a drying device for drying sheet tobacco as it is conveyed along a moving conveyor belt the combination of a distributor for passing a stream of hot air over the surface of the belt upon which the tobacco sheet is disposed, said distributor comprising means forming with said belt a collecting housing, additional means disposed within said collecting housing and forming a distribution housing with a distribution surface adjacent the surface of the belt, said distribution surface having a plurality of passageways extending transversely of the belt and spaced longitudinally of the belt, the transverse area of the distribution housing progressively decreasing in the direction opposite to the belt movement, the transverse area of the collecting housing increasing in a direction opposite to the belt movement, and means for introducing heated air into the distribution housing at the end of largest transverse section.

12. A device as defined in claim 11 including a plurality of said distributors positioned in immediate successive relation longitudinally of the belt and interconnected in cascade relation such that the air is conveyed from one distributor to the next distributor in a direction opposite to the direction of movement of the belt, said means for introducing heated air into the distribution housing including fan means with there being separate fan means for each distributor and with the fan means being operative to withdraw air from the collecting chamber of one distributor and introduce it into the distribution chamber of the next succeeding distributor.

13. A device as defined in claim 11 wherein said distribution surface is comprised of a plurality of channel members extending in a direction transversely of the belt and secured in spaced relation to form the transversely extending passageways.

14. Tobacco processing apparatus comprising in combination a conveyor belt adapted to move in a predetermined direction and to carry on its upper surface a thin layer of moist tobacco product, apparatus forming a drying station through which said belt passes for drying the tobacco product, said apparatus including means to simultaneously direct a flow of air over the upper surface of the belt and direct steam in contact with the under surface below, said means including means forming a chamber beneath the belt and having upwardly extending walls that slidably engage the under side of the belt, means for admitting steam to said chamber to contact and heat said belt, and an evacuation system for removing steam from said chamber including headers extending longitudinally of the chamber and having openings distributed therealong and communicating with the chamber and pump means communicating with said headers operative to withdraw steam from the compartment through the headers.

15. Drying apparatus for use in drying moist sheet material, such as tobacco, comprising a conveyor belt having a generally horizontal region, means for heating the underside of said horizontal region, means for conveying a gas over the upper region of the belt, this last named means including a plurality of distributors connected in series flow relation and disposed in successive positions longitudinally of the belt, means for passing a heated gas successively through said distributors in a direction generally opposite to the movement of the belt at said region, each of said distributors including a distributing surface in parallel closely spaced relation above the upper surface of the belt, each distributing surface having a plurality of passageways extending transversely of the belt, said distributors additionally including a distributing chamber the lower surface of which is formed by said distributing surface, said distributing chamber having a decreasing transverse area in a direction opposite to the movement of the belt are means for introducing the heating gas into the distribution chamber at the end thereof of greatest transverse area, a collecting chamber associated with the distributing chamber and into which the gas is conveyed after passing through the transverse openings in the distributing surface, said collecting chamber having an increasing transverse area in the direction opposite to the movement of the belt and means for conveying the gas from the collecting chamber to the next succeeding distributing chamber.

References Cited

UNITED STATES PATENTS

| 2,326,115 | 8/1943 | Arthur | 34—226 |
| 3,250,315 | 5/1966 | Osborne et al. | 34—216 X |
| 3,308,556 | 3/1967 | Franklin et al. | 34—207 |
| 3,295,222 | 1/1967 | Geitz | 34—236 X |

KENNETH W. SPRAGUE, *Primary Examiner.*